(12) United States Patent
Barhudarian et al.

(10) Patent No.: US 11,886,549 B2
(45) Date of Patent: Jan. 30, 2024

(54) NON-FUNGIBLE PHYSICAL FABRIC TOKEN SYSTEM

(71) Applicant: Microsoft Technology Licensing, LLC, Redmond, WA (US)

(72) Inventors: Evelina Barhudarian, Renton, WA (US); Alemayehu Seyed, Mercer Island, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 200 days.

(21) Appl. No.: 17/516,092

(22) Filed: Nov. 1, 2021

(65) Prior Publication Data

US 2023/0135947 A1 May 4, 2023

(51) Int. Cl.
*G06F 21/10* (2013.01)
*H04L 9/30* (2006.01)
*H04L 9/32* (2006.01)

(52) U.S. Cl.
CPC .......... *G06F 21/10* (2013.01); *H04L 9/30* (2013.01); *H04L 9/321* (2013.01)

(58) Field of Classification Search
CPC ........................................... G06F 21/10
See application file for complete search history.

(56) References Cited

U.S. PATENT DOCUMENTS

| 2020/0005284 | A1* | 1/2020 | Vijayan ................. H04L 63/08 |
| 2021/0097508 | A1* | 4/2021 | Papanikolas ....... G06Q 20/3678 |
| 2021/0133700 | A1* | 5/2021 | Williams ........... G06Q 20/3678 |
| 2021/0390531 | A1* | 12/2021 | Voorhees ............. G06Q 20/367 |

* cited by examiner

*Primary Examiner* — Bradley W Holder
(74) *Attorney, Agent, or Firm* — Workman Nyedgger

(57) ABSTRACT

A non-fungible physical fabric token (NFPFT) system includes a piece of smart fabric coupled to a physical item. The piece of smart fabric includes a grid of cells configured to receive and persistently store one or more datasets. The NFPFT system also includes a verification and authentication device configured to receive a first dataset associated with the physical item and a second dataset associated with a non-fungible token (NFT) recorded in a decentralized system. The NFT is associated with the physical item. The verification and authentication device is further configured to cause the first dataset and the second dataset to be persistently stored in the grid of cells of the smart fabric.

7 Claims, 16 Drawing Sheets

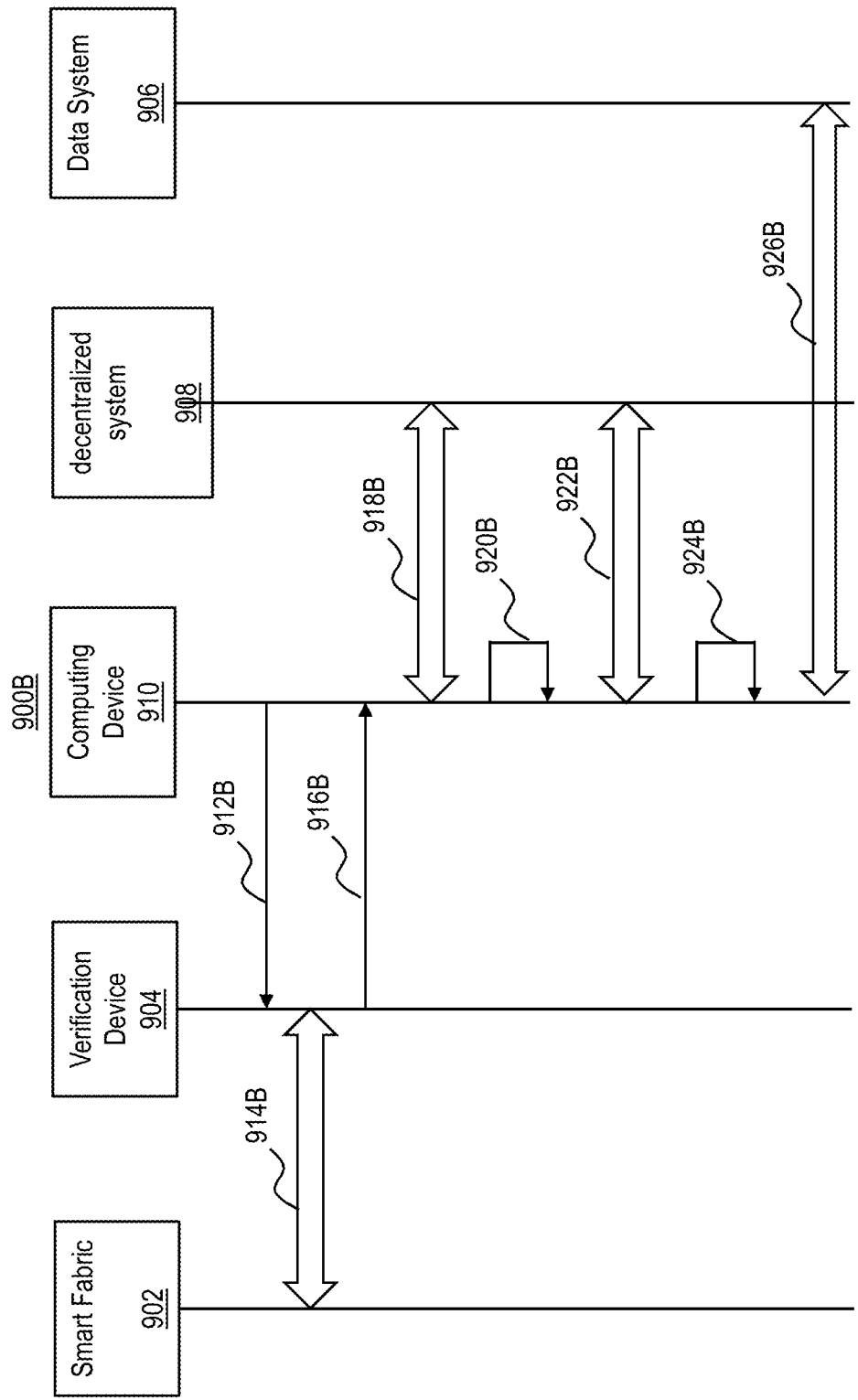

NON-FUNGIBLE PHYSICAL FABRIC TOKEN SYSTEM

BACKGROUND

Counterfeit luxury goods, such as (but not limited to handbags), cause serious damages to the luxury brands. Recently, fake items are getting more and more realistic. To the untrained eyes, the fake items often look just like the genuine items, and even trained authenticators cannot always clearly differentiate the fake items and the genuine items. Further, the luxury goods resale market has grown online, through which the fakes items might be given additional lives and markets for consumption, further damaging the luxury brands.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a non-fungible physical fabric token (NFPFT) system, including a piece of smart fabric coupled to a physical item. The piece of smart fabric includes a grid of cells configured to receive and persistently store one or more datasets. The NFPFT system further includes a verification and authentication device configured to receive at least one of (1) a first dataset associated with the physical item and/or (2) a second dataset associated with a non-fungible token (NFT) associated with the physical item. The NFT is registered in a decentralized system. The verification and authentication device further causes the at least one of the first dataset and/or the second dataset to be persistently stored in the grid of cells of the smart fabric.

In some embodiments, the NFT includes an NFT identifier associated with the NFT and a creator identifier associated with a creator of the NFT. The creator of the NFT corresponds to a creator of the physical item. In some embodiments, the first dataset and/or the second dataset stored on the smart fabric contain the NFT identifier and/or the creator identifier.

In some embodiments, the NFT also includes an owner identifier associated with an owner of the NFT. The owner of the NFT corresponds to an owner of the physical item. The first dataset and/or the second dataset stored on the smart fabric further contain the owner identifier. In some embodiments, the NFT further includes a service end point of a data system configured to store a data record associated with the physical item. The first dataset and/or the second dataset stored on the smart fabric further contain the service end point. As such, when the first dataset and/or the second dataset are accessed by a computing device, the computing device can retrieve the NFT from the decentralized system and/or obtain the data record associated with the physical item from the data system via the service end point.

The principles described herein are also related to a method implemented at a computing system for linking a physical item with an NFT registered in a decentralized system. The physical item is coupled to a piece of smart fabric having a grid of cells configured to receive and persistently store data associated with the physical item or the NFT. The method includes creating a new NFT associated with the physical item. The NFT contains an NFT identifier associated with the NFT, an item identifier associated with the physical item, and a creator identifier associated with a creator of the NFT. The creator of the NFT corresponds to a creator of the physical item.

The method further includes storing at least one of (1) a first dataset associated with the physical item or (2) a second dataset associated with the NFT in the grid of cells of the smart fabric. In response to receiving a request, from a computing device, for requesting data stored in the grid of cells of the smart fabric, sending at least one of the first dataset or the second dataset to the computing device, causing the computing device to retrieve the NFT from the decentralized system based on the first dataset or the second dataset, verify the creator of the NFT, and in response to verification of the creator of the NFT, determine that the physical item is authentic.

The principles described herein are also related to a server computer system configured to create an NFT associated with a physical item. The NFT contains an NFT identifier associated with the NFT, an item identifier associated with the physical item, a creator identifier associated with a creator of the NFT, and an owner identifier associated with an owner of the NFT. The creator of the NFT corresponds to a creator of the physical item, and the owner of the NFT corresponds to an owner of the physical item.

The server computer system is further configured to store data associated with the physical item relationally with the item identifier as a data record in one or more computer-readable hardware storage devices. In response to receiving a request from a computing device containing the item identifier, the server computer system is configured to retrieve the data record based on the item identifier and send the data record associated with the physical item to the computing device.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which:

FIG. 9B illustrates an example communication pattern for verifying authenticity and/or ownership of a physical item associated with an NFT;

DETAILED DESCRIPTION

Figure 1A:
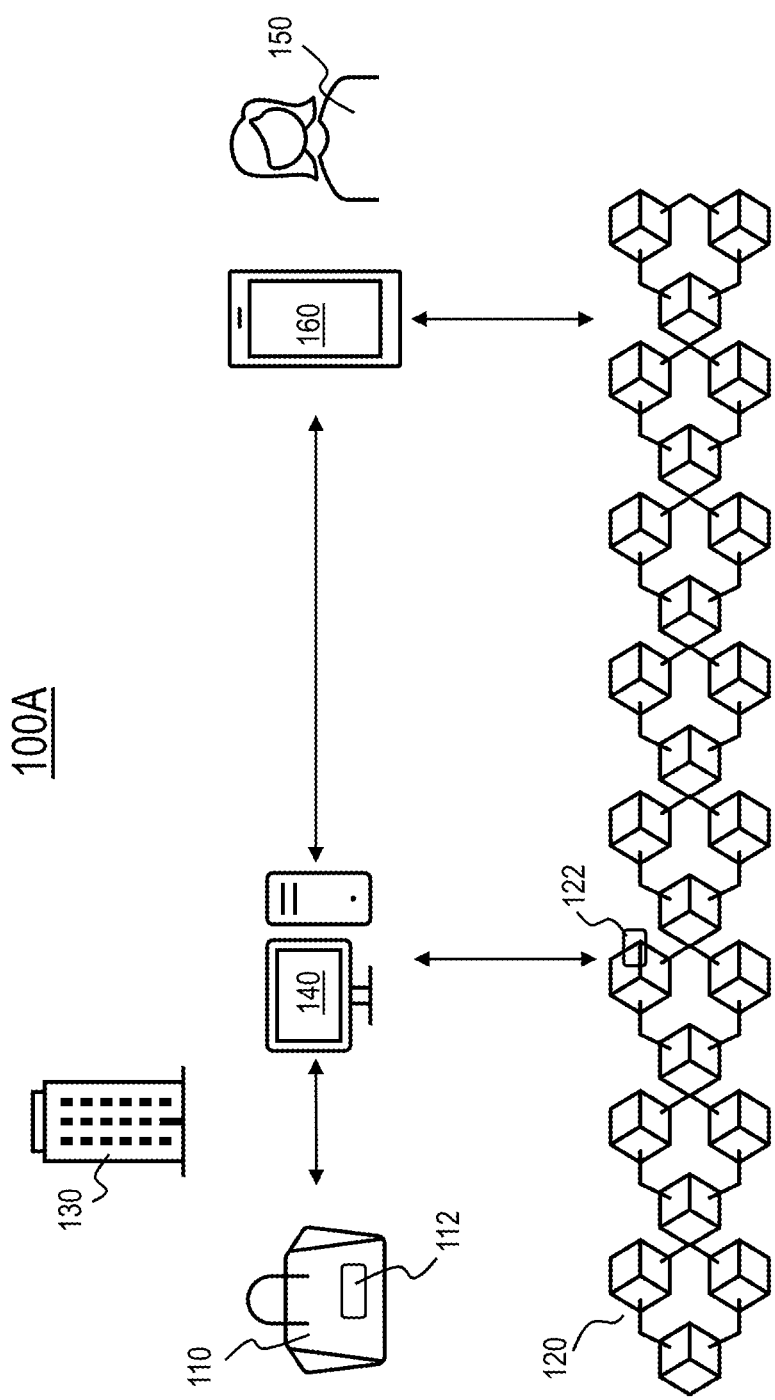
FIG. 1A illustrates an example of non-fungible physical fabric token (NFPFT) system configured to associate a physical item with a non-fungible token (NFT) via a piece of smart fabric coupled to the physical item.

Non-fungible token (NFT) is a type of digital token that is unique and cannot be replaced with something else. Once an NFT is created and/or sold, the NFT and the transaction related to the NFT are recorded in a decentralized system. A decentralized system is a system that is consensually shared and synchronized across multiple sites, institutions, and/or geographies, accessible by many different devices. For example, a blockchain or a distributed ledger is a type of decentralized system. The decentralized nature of such a system allows transactions to have multiple "witnesses" distributed at different locations, causing the recorded transactions to be immutable. As such, NFT generally can provide a much more secure mechanism (than traditional centralized systems) for the authentication and verification of digital assets.

Further, an NFT is similar to a non-fungible good (e.g., a luxury good) in many aspects. For example, similar to NFTs, luxury goods often have their unique designs and/or have been produced in limited quantity. However, unlike an NFT, once a luxury good is sold and being used, the authenticity of the luxury good is often difficult to be determined. On the other hand, the authenticity of an NFT can always be verified due to its immutability and decentralized nature.

The principles described herein are related to associating physical items (e.g., luxury goods) with NFTs registered on decentralized systems to provide a secure system for authentication and verification of the physical items. In particular, the embodiments described herein are related to a non-fungible physical fabric token (NFPFT) system, including a piece of smart fabric coupled to a physical item. The piece of smart fabric includes a grid of cells configured to receive and persistently store one or more datasets. The NFPFT system further includes a verification and authentication device configured to receive at least one of (1) a first dataset associated with the physical item and/or (2) a second dataset associated with a non-fungible token (NFT). The NFT is registered in a decentralized system. The verification and authentication device further causes the at least one of the first dataset and/or the second dataset to be persistently stored in the grid of cells of the smart fabric.

In some embodiments, the NFT contains an NFT identifier associated with the NFT and a creator identifier associated with a creator of the NFT. The creator of the NFT corresponds to a creator of the physical item. In some embodiments, the first dataset and/or the second dataset stored on the smart fabric contain the NFT identifier and/or the creator identifier.

In some embodiments, the NFT also includes a creator proof data structure, including a signature generated using a private key associated with the creator and verifiable using a public key associated with the creator. The public key associated with the creator is recorded in the decentralized system and retrievable based on the creator identifier.

In some embodiments, the verification and authentication device is further configured to receive a request from a computing device for the one or more datasets stored in the piece of smart fabric, and transmit the requested one or more datasets to the computing device. In response to receiving the one or more datasets stored in the smart fabric, the computing device is caused to retrieve the NFT from the decentralized system based on the received one or more datasets. The computing device is then caused to extract the creator identifier and the creator proof data structure from the NFT, retrieve the public key of the creator from the decentralized system based on the creator identifier; and verify the creator of the NFT based on the creator proof data structure and the public key of the creator. In response to verification of the creator of the NFT, the computing device can then determine that the physical item is authentic.

In some embodiments, the NFT also includes an owner identifier associated with an owner of the NFT. The owner of the NFT corresponds to an owner of the physical item. The one or more datasets further include the owner identifier. In some embodiments, the NFT also includes an owner proof data structure, including a signature generated using a private key associated with the owner and verifiable using a public key associated with the owner. The public key associated with the owner is recorded in the decentralized system and retrievable based on the owner identifier.

In some embodiments, in response to receiving data associated with the NFT from the smart fabric, the computing device is further configured to extract the owner identifier and the owner proof data structure from the NFT; retrieve the public key associated with the owner from the decentralized system based on the owner identifier; and verify the owner of the NFT based on the owner proof data structure and the public key associated with the owner. In response to verification of the owner of the NFT, the computing device can then determine who the owner of the physical item is.

In some embodiments, the verification and authentication device is further configured to receive a request, from the computing device, to update data associated with the owner stored in the smart fabric. The request includes an identifier associated with a requester and an identifier associated with a new owner. In response to receiving the request, the verification and authentication device is configured to verify whether the identifier of the requester corresponds to an identifier of a current owner stored in the smart fabric. In response to verifying that the requester corresponds to the current owner, the verification and authentication device causes the identifier associated with the current owner stored in the smart fabric to be replaced with the identifier associated with the new owner.

In some embodiments, in response to updating the ownership of the physical item, the verification and authentication device also causes ownership of the NFT to be updated to the new owner in the decentralized system. In some embodiments, in response to updating the ownership of the physical item, the verification and authentication device also causes a notification to be sent to a device associated with the previous owner and/or the new owner.

In some embodiments, the NFT further includes a service end point of a data system configured to store a data record associated with the physical item. In some embodiments, the first dataset and/or the second dataset also contain the service endpoint. The verification and authentication device is further configured to cause the computing device to access the data system via the service end point to obtain the data record associated with the physical item. In some embodiments, in response to an ownership change, the verification and authentication device is further configured to cause the data record associated with the physical item to be updated to reflect the new owner via the service end point.

The principles described herein are also related to a method implemented at a computing system for linking a physical item with an NFT registered in a decentralized system. The physical item is coupled to a piece of smart fabric having a grid of cells configured to receive and persistently store data associated with the physical item or the NFT. The method includes creating a new NFT associated with the physical item. The NFT contains an NFT identifier associated with the NFT, an item identifier associated with the physical item, and a creator identifier associated with a creator of the NFT. The creator of the NFT corresponds to a creator of the physical item, and the NFT is registered in the decentralized system.

The method further includes storing at least one of (1) a first dataset associated with the physical item or (2) a second dataset associated with the NFT in the grid of cells of the smart fabric. In response to receiving a request, from a computing device, for requesting data stored in the grid of cells of the smart fabric, sending at least one of the first dataset or the second dataset to the computing device, causing the computing device to retrieve the NFT from the decentralized system based on the first dataset or the second dataset, verify the creator of the NFT, and in response to verification of the creator of the NFT, determine that the physical item is authentic.

The principles described herein are also related to a server computer system configured to create an NFT associated with a physical item. The NFT contains an NFT identifier associated with the NFT, an item identifier associated with the physical item, a creator identifier associated with a creator of the NFT, and an owner identifier associated with an owner of the NFT. The creator of the NFT corresponds to a creator of the physical item, and the owner of the NFT corresponds to an owner of the physical item.

The server computer system is further configured to store data associated with the physical item relationally with the item identifier as a data record in one or more computer-readable hardware storage devices. In response to receiving a request from another computing device containing the item identifier, the server computer system is configured to send the data record associated with the physical item to the computing device.

Figure 1B:
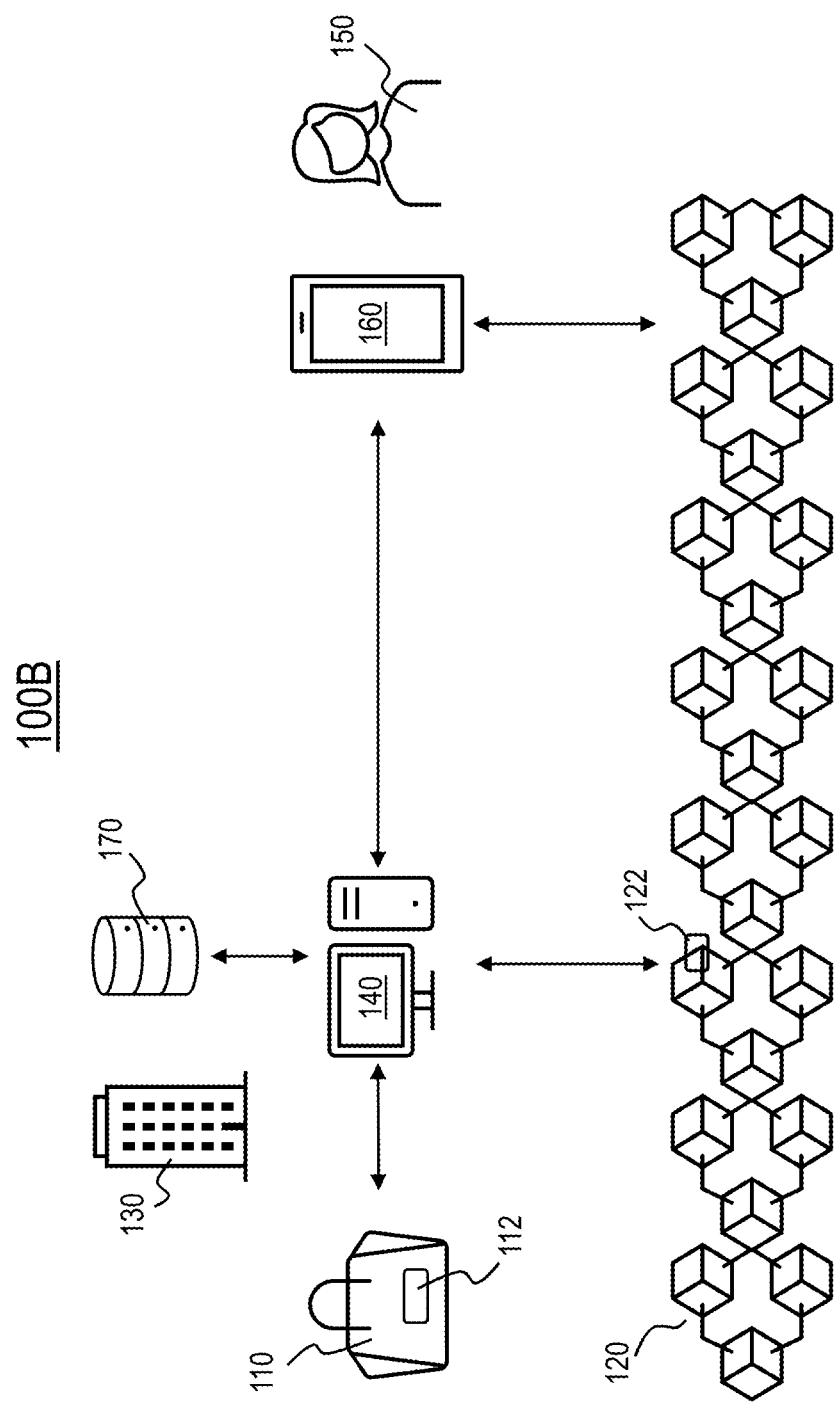
FIG. 1B illustrates another example of NFPFT system further including a data system configured to store data records associated with physical items.

FIGS. 1A-1B illustrates examples of NFPFT systems 100A, 100B described herein. FIG. 1A illustrates an example scenario of how a newly created physical item 110 may be linked to an NFT 122 registered in a decentralized system 120. For example, the physical item 110 may be a luxury good produced by a manufacture 130. A piece of smart fabric 112 is coupled to the physical item 110. After the physical item 110 is manufactured, a computer system 140 associated with the manufacture 130 is configured to generate and register an NFT 122 in the decentralized system 120, and store a first dataset associated with the physical item 110 and/or a second dataset associated with the NFT 122 in the piece of smart fabric 112 coupled to the physical item 110.

Figure 7:
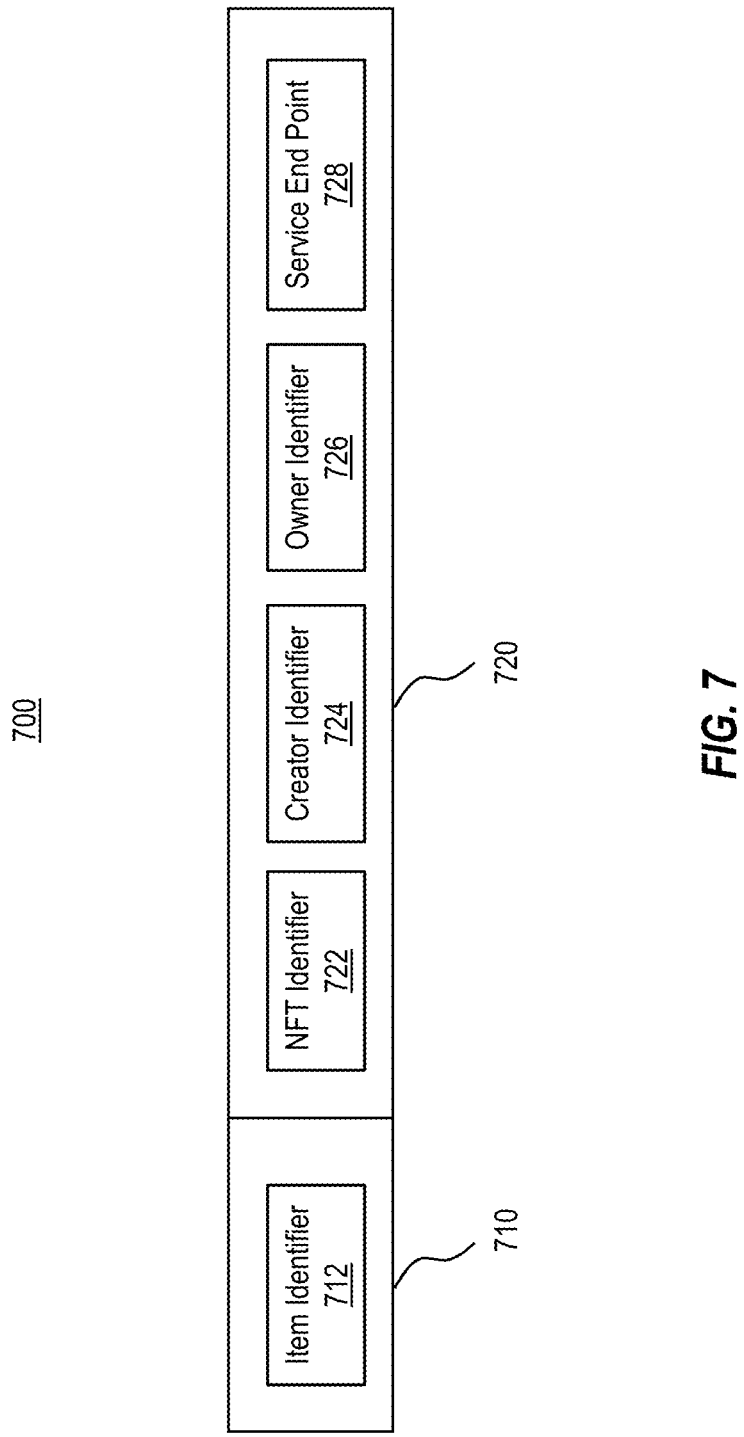
FIG. 7 illustrates an example data structure configured to store a first dataset associated with a physical item and a second dataset associated with an NFT.

FIG. 7 illustrates an example data structure 700 of the smart fabric 300 configured to store the first dataset 710 associated with the physical item 110 and the second dataset 720 associated with the NFT 122. In some embodiments, the first dataset 710 includes an item identifier 712 associated with the physical item 110, and the second dataset includes an NFT identifier 722 associated with the NFT. In some embodiments, the second dataset 720 further includes a creator identifier 724 associated with a creator of the NFT. Notably, the creator of the NFT is the same as a creator of the physical item (e.g., the manufacture 130). In some embodiments, the second dataset 720 further includes an owner identifier 726 associated with a current owner of the physical item. Before the physical item 110 is sold to a customer, the original owner of the physical item 110 is often the creator of the item (e.g., the manufacture 130). In some embodiments, the first dataset 710 may also include a creator identifier and an owner identifier (not shown).

When the physical item 110 is sold to a customer 150, the computer system 140 associated with the manufacture 130 is configured to update the first dataset 710 and/or second dataset 720 stored in the smart fabric 112 and/or the NFT 122 registered in the decentralized system 120. In some embodiments, the computer system 140 associated with the manufacture 130 is further configured to communicate with a computing device 160 (e.g., a mobile device) associated with the customer 150 to verify the identifier of the customer 150. In response to verifying the identifier of the customer 150, the computer system 140 associated with the manufacture 130 is configured to update the owner identifier associated with the current owner of the physical item to the identifier of the customer 150, and also update the current owner of the NFT to the identifier of the customer 150.

Notably, customer 150 may later sell the physical item 110 to a next customer (not shown). A similar process would occur when customer 150 sells physical item 110 to the next customer. For example, the computing device 160 associated with customer 150 may be configured to verify the next customer's identifier. The computing device 160 may also be configured to request to replace the data associated with the current owner (e.g., the owner identifier) stored in the piece of smart fabric with data associated with the next customer.

Further, the computing device 160 may also be configured to update the owner identifier of the NFT to the identifier of the next customer.

As briefly described above, a decentralized system is a decentralized data system. In some embodiments, users of the decentralized system use decentralized identifiers to identify themselves and authenticate others. For example, the creator identifier can be a decentralized identifier associated with the creator, and/or each owner identifier can be a decentralized identifier associated with the corresponding owner.

In some embodiments, the NFPFT system further includes a data system configured to store a data record associated with the physical item 110 and/or NFT 122. FIG. 1B illustrates such an example NFPFT system 100B, including a data system 170. In some embodiments, the data system 170 and the computer system 140 are integrated together, functioning as a single server computer system. In some embodiments, the data system 170 and the computer system 140 are separate server computer systems configured to communicate with each other via a network. The computer system of manufacture 130 is further configured to record a data record associated with the physical item 110 in the data system 170. For example, the data record associated with the physical item 110 may contain (but are not limited to) (1) attribute(s) of the physical item (e.g., a design, a color, a photo, and/or a sales price of the physical item), (2) personal information associated with owner(s) of the physical item 110 (e.g., a name, an email address, a phone number, a physical address of each owner), and/or (3) service performed on the physical item 110 (e.g., repair, maintenance, appraisal, etc.).

Figure 2:
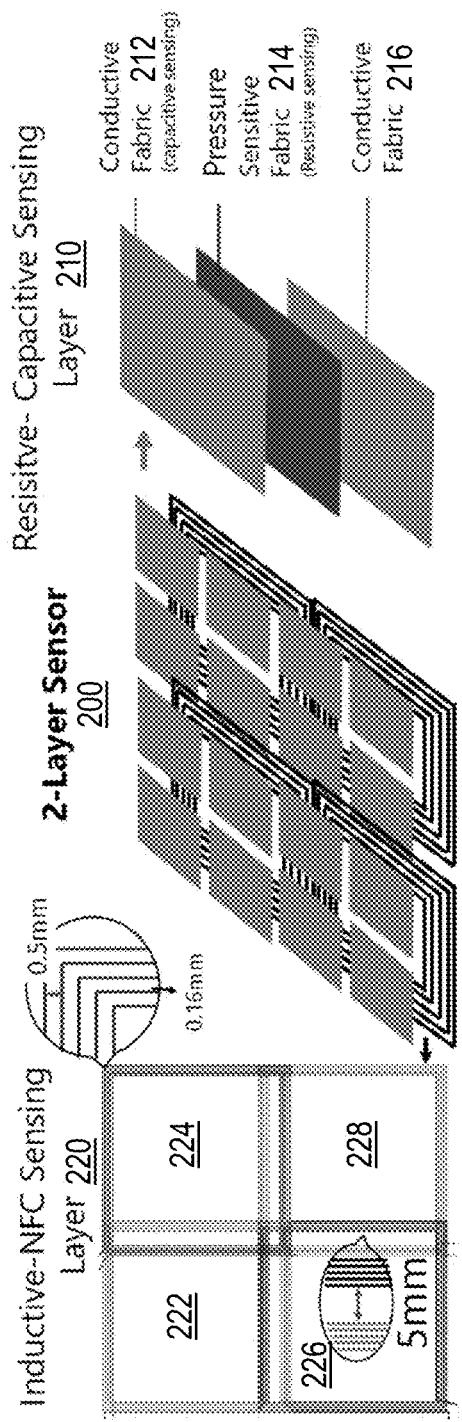
FIG. 2 illustrates an example embodiment of smart fabric.

In some embodiments, the piece of smart fabric 112 coupled to the physical item includes a grid of cells configured to store one or more datasets associated with the physical item and/or the NFT. FIG. 2 illustrates an example embodiment of smart fabric 200, which corresponds to the smart fabric 112 of FIG. 1A or 1B. As illustrated in FIG. 2, the piece of smart fabric 200 includes (1) a first layer 210 (also referred to as the "resistive-capacitive sensing layer") having multiple resistive sensors and multiple capacitive sensors, and (2) a second layer 220 (also referred to as the "inductive-NFC sensing layer") having multiple inductive sensors and multiple NFC devices. Each of the multiple resistive sensors corresponds to each of the multiple NFC devices, respectively. Each of the multiple inductive sensors corresponds to each of the multiple NFC devices, respectively.

In some embodiments, in the first layer 210, each of the multiple capacitive sensors includes a first piece of conductive fabric 212 and a second piece of conductive fabric 216. In some embodiments, the conductive fabric 212, 216 includes non-metallic conductive fabric, such as a conductive polymer. Each of the multiple resistive sensors includes a piece of pressure sensing fabric 214, such as Velostat. In some embodiments, each piece of pressure sensing fabric 214 of the resistive sensor is sandwiched between the first piece of conductive fabric 212 and the second piece of conductive fabric 216 of the corresponding capacitive sensor. Each piece of the conductive fabric 212, 216, and each piece of pressure sensing fabric 214 serves as an electrode. The rows and columns of electrodes 212, 216 of the capacitive sensors are electrically separated, while the rows and columns of electrodes 214 of the resistive sensors are electrically connected. As illustrated, the resistive sensors and the capacitive sensors are arranged in a grid of 4×4, though the invention is not limited to this structure. For example, a greater number of capacitive sensors and/or resistive sensors (e.g., a grid of 4×8, 8×8, 16×16, 32×32, 64×64, etc.) may also be implemented.

The second layer 220 includes multiple coils 222, 224, 226, 228 configured to act as both inductor coils for the multiple inductive sensors and sensor coils for the multiple NFC devices. In some embodiments, every two adjacent coils among the plurality of coils overlap each other. Because an operation may become unreliable when the inductance of the coils is below 4 uH, it is advantageous to implement the coils 222, 224, 226, 228 to have an inductance of at least 4 uH, and about 5 or more traces are preferred. As illustrated, four coils are arranged in a grid of 2×2, and each coil is rectangular-shaped or square-shaped and has about 5 traces, though the invention is not limited to this structure. For example, a different shape of coils (e.g., circular-shaped) or a greater number of coils (e.g., a grid of 2×4, 4×4, 8×8, 16×16, 32×32, 64×64, etc.) may also be implemented.

In some embodiments, each of the multiple capacitive sensors is configured to sense touch input. In some embodiments, each of the multiple resistive sensors is configured to sense pressure based on the change in the resistance of a pressure-sensitive material (such as piezo-resistive material) when it is pressed or deformed. Thus, the resistive sensors are also configured to sense touch input.

In some embodiments, each of the multiple NFC devices uses alternating electromagnetic fields for receiving and transmitting data. When an NFC device is triggered by an electromagnetic interrogation signal from a nearby antenna coil, it transmits its data to the sensor coil. In some embodiments, each NFC device includes a coil that is laid out in a particular manner, such that the NFC device not only can detect tags, but also can function as an inductive sensor.

Note, although the smart fabric 200 illustrated in FIG. 2 includes capacitive sensors and inductive sensors, the capacitive sensors and the inductive sensors are not required. In some embodiments, the smart fabric 200 only includes a layer of capacitive sensors and a layer of NFC devices. Further, it is also not necessary that a grid of 2×2 capacitive sensors corresponds to one NFC device.

Figure 3:
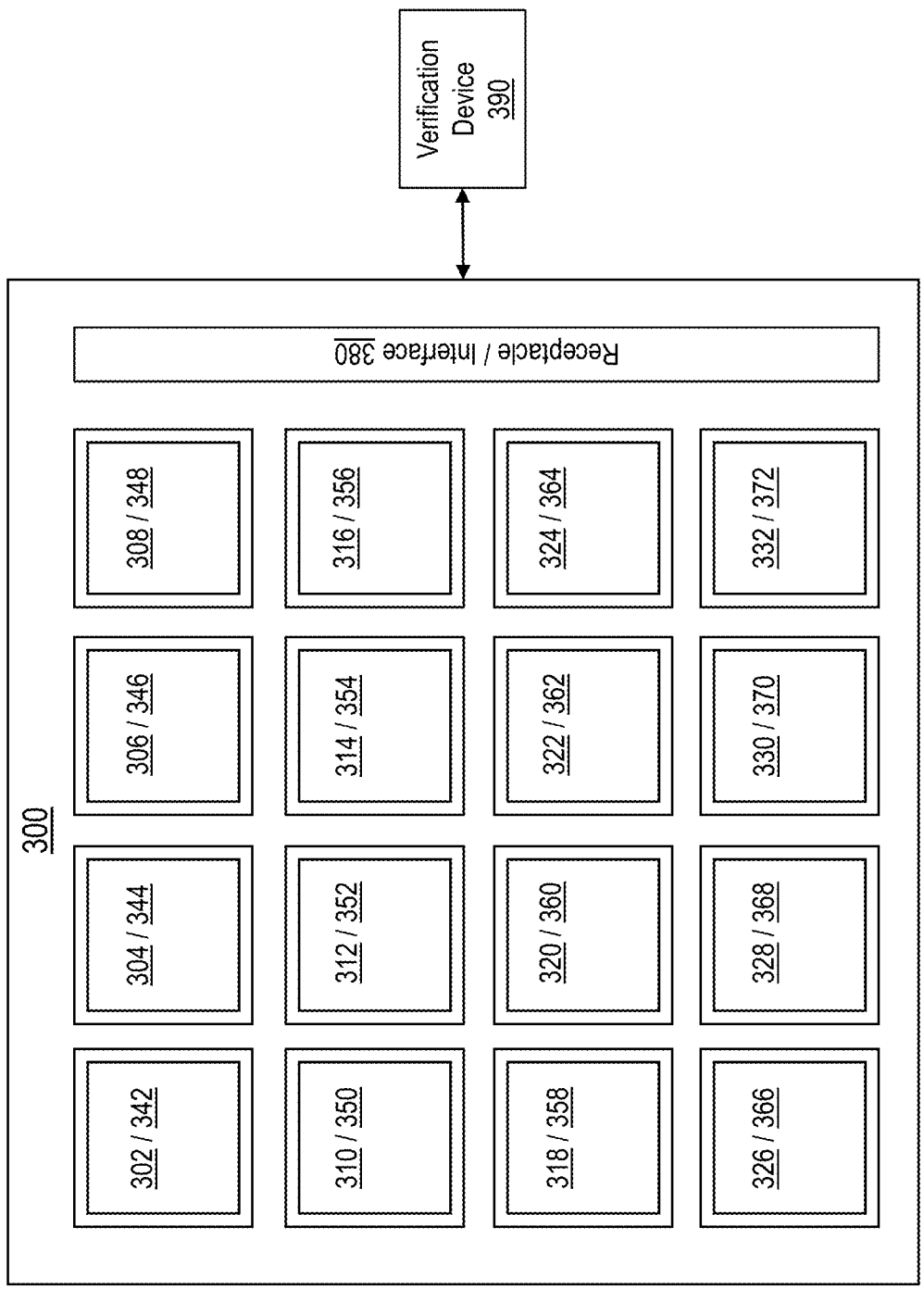
FIG. 3 illustrates another example embodiment of smart fabric configured to be connected to a verification device.

FIG. 3 illustrates another example piece of smart fabric 300 that also corresponds to the smart fabric 112. As illustrated, the piece of smart fabric 300 only includes a capacitive sensing layer, an NFC layer, and a receptacle or an interface configured to be connected to a verification and authentication device 390. The capacitive sensing layer includes a grid of 4×4 capacitive sensors 302, 304, 306, 308, 310, 312, 314, 316, 318, 320, 322, 324, 326, 328, 330, and 332. The NFC sensing layer includes a grid of 4×4 NFC devices 342, 344, 346, 348, 350, 352, 354, 356, 358, 360, 362, 364, 366, 368, 370, and 372. As illustrated, each of the capacitive sensors 302, 304, 306, 308, 310, 312, 314, 316, 318, 320, 322, 324, 326, 328, 330, and 332 corresponds to one of the NFC devices 342, 344, 346, 348, 350, 352, 354, 356, 358, 360, 362, 364, 366, 368, 370, and 372. Again, different shaped grids may be implemented to achieve the same or similar purposes, such as a grid of 2×4, 8×8, 16×16, 32×32, or 64×64 may be implemented in different embodiments. Generally, the greater the grid, the more data can be recorded in a piece of smart fabric, and the more secure verification of the smart fabric 300 can provide.

In some embodiments, the smart fabric 300 also includes a receptacle or an interface 380 configured to receive a verification and authentication device 390. In some embodiments, the verification and authentication device 390 includes one or more power sources (e.g., battery) configured to provide power to the smart fabric 300. In some embodiments, the verification and authentication device 390 also includes one or more processors configured to read data from and/or write data to the smart fabric 300 and transmit the read data to another device.

Figure 4:
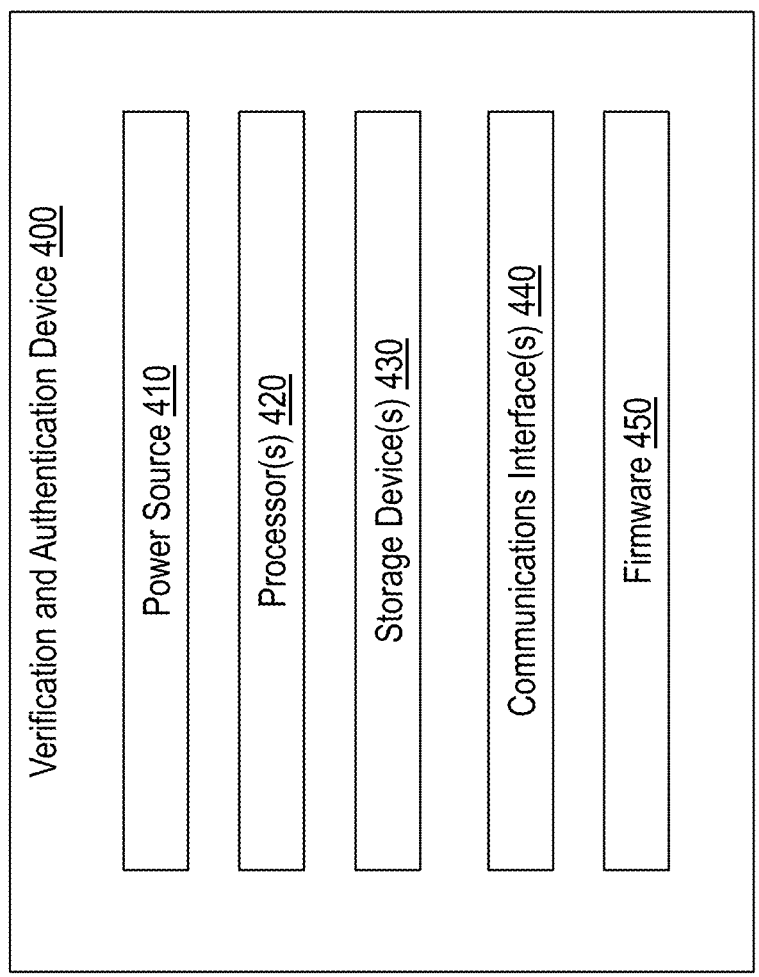
FIG. 4 illustrates an example architecture of a verification and authentication device.

FIG. 4 illustrates an example architecture of a verification and authentication device 400 that corresponds to the verification and authentication device 390 of FIG. 3. The verification and authentication device 400 includes a power source 410, one or more processors 420, one or more storage devices 430, and one or more communication interfaces 440. In some embodiments, the verification and authentication device 400 has its firmware 450 installed on the one or more storage devices 430, the firmware 450 is configured to allow the verification and authentication device 400 to communicate with the smart fabric 112, 200, or 300, the computer system 140, the computing device 160, and/or the data system 170. For example, the verification and authentication device 400 is configured to receive data associated with an NFT, record the data associated with the NFT in the smart fabric 300, and/or verify whether the received data associated with the NFT corresponds to the second dataset stored in the smart fabric 300.

The power source 410 is configured to power the one or more processors 420 and storage devices 430. When the verification and authentication device 400 is connected to a piece of smart fabric 112, the verification and authentication device 400 is configured to power the sensors embedded on the smart fabric 112. The one or more communication interfaces 440 includes an interface configured to be connected to the receptacle or interface 380 of the smart fabric 300. In some embodiments, the one or more communication interfaces 440 also includes a wireless communication interface (e.g., a Bluetooth low energy interface) configured to be connected to a mobile device (e.g., the computing device 160 of FIG. 1A or 1B). In some embodiments, the one or more communication interface 440 also includes a wireless communication interface (e.g., a Wi-Fi interface, a 2G, 3G, 4G, and/or 5G interface) configured to connect to a decentralized system (e.g., decentralized system 120 of FIG. 1A or 1B) or a data system (e.g., the data system 170 of FIG. 1B) via a computer network. In some embodiments, the verification and authentication device 400 also includes a display (including touch or non-touch display) and one or more buttons configured to allow a user to directly interact with the verification and authentication device 400.

Figure 5:
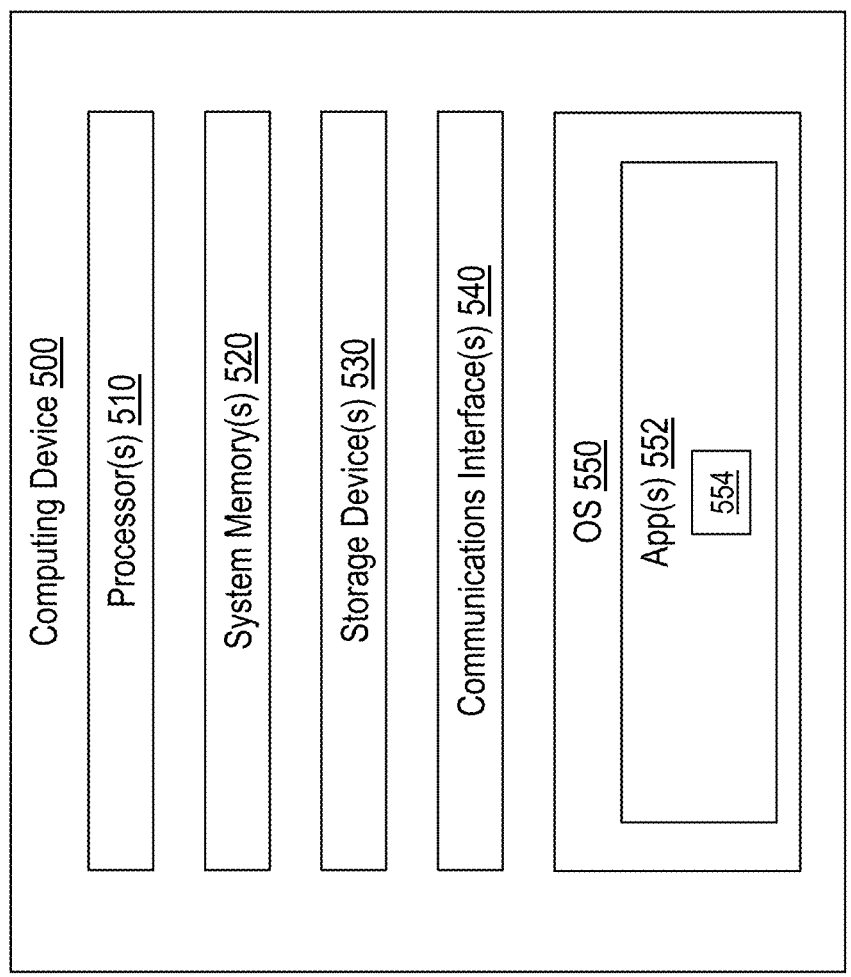
FIG. 5 illustrates an example architecture of a computing device configured to communicate with the verification device of FIG. 4 and a decentralized system on which NFTs are registered.

FIG. 5 illustrates an example architecture of a computing device 500 (e.g., a mobile device of a current owner or potential buyer of a physical item) that corresponds to the computing device 160 of FIG. 1A or 1B. The computing device 500 includes one or more processors 510, one or more system memories 520, one or more storage devices 530, and one or more communications interfaces 540. In some embodiments, the one or more communication interfaces 540 includes a first wireless communication interface (e.g., a Wi-Fi interface, a 2G, 3G, 4G, and/or 5G interfaces) configured to communicate with a decentralized system (e.g., decentralized system 120 of FIG. 1A or 1B) and/or a data system (e.g., data system 170 of FIG. 1B).

In some embodiments, the one or more communication interfaces 540 also includes a second wireless communication interface (e.g., NFC interface) configured to communicate with NFC devices embedded in a piece of smart fabric (e.g., smart fabric 112, 200, and/or 300). In some embodiments, the one or more communication interfaces 540 also includes a third wireless communication interface (e.g., a Bluetooth low energy interface) configured to communicate with a verification and authentication device (e.g., verification and authentication device 390 and/or 400).

In some embodiments, the computing device 500 has an operating system 550 installed on the one or more storage devices 530 and loaded into the one or more system memories 520. In some embodiments, the computing device 500 also includes one or more applications 552 installed on the one or more storage devices 530. One of the one or more applications 552 is an authentication application 554 that allows the computing device 500 to communicate with the verification and authentication device 390, 400, the smart fabric 112, 200, 300, the decentralized system 120, and/or the data system 170. In some embodiments, the authentication application 554 is configured to receive data stored in the smart fabric 112, 200, 300 from the verification and authentication device 390, 400, and request data from the decentralized system 120 and/or the data system 170.

Figure 8:
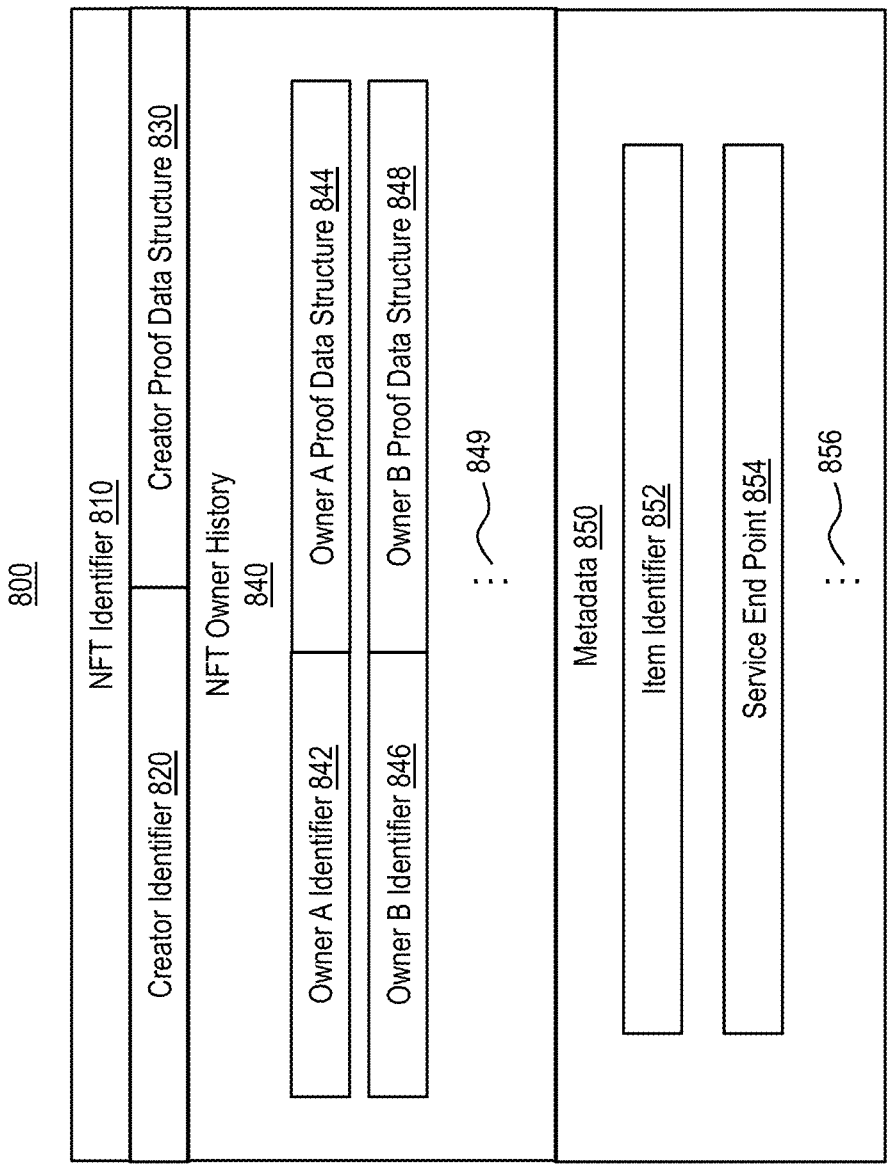
FIG. 8 illustrates an example data structure of an NFT associated with a physical item.

In some embodiments, the authentication application 554 is configured to access the decentralized system 120 to retrieve the NFT associated with the item based on the data stored in the smart fabric 112. FIG. 8 illustrates an example data structure of an NFT 800. As illustrated, the NFT 800 includes an NFT identifier 810 and a creator identifier 820 associated with a creator of the NFT, which corresponds to a creator of the physical item (e.g., the manufacture 130 of the physical item 110).

In some embodiments, the NFT 800 also includes a creator proof data structure 830, and the computing device 500 is configured to extract the creator proof data structure 830 from an NFT retrieved from the decentralized system 120. The computing device 500 is configured to use the creator proof data structure 830 to verify the authenticity of the physical item 110 coupled to the smart fabric 300.

In some embodiments, the creator proof data structure includes a signature signed by a private key associated with a creator of the physical item 110. A corresponding public key associated with the creator is registered in the decentralized system 120 and retrievable based on the creator identifier. In some embodiments, the computing device 500 is further configured to retrieve the public key associated with the creator from the decentralized system based on the creator identifier, and verify the authenticity of the physical item 110 based on the creator proof data structure and the retrieved public key associated with the creator of the physical item.

In some embodiments, the NFT 800 includes data associated with NFT owner history 840. In some embodiments, the NFT owner history 840 includes each of the current and historical owners that have owned the NFT, corresponding to the respective current and historical owners that have owned the physical item. In some embodiments, for each owner, an owner identifier (e.g., owner A identifier 842, owner B identifier 846) is recorded in the NFT 800. In some embodiments, for each owner, an owner proof data structure (e.g., owner A proof data structure 844, owner B proof data structure 848) is also recorded in the NFT 800. The ellipsis 849 represents that there may be any number of owners/previous owners recorded in the NFT owner history 840 of the NFT 800.

In some embodiments, the computing device 500 is further configured to retrieve the owner identifier and the owner proof data structure corresponding to a current owner of the NFT, which is also a current owner of the physical item. In some embodiments, the owner proof data structure includes a signature signed by a private key associated with the current owner of the physical item. A corresponding public key associated with the current owner is recorded in the decentralized system 120 and retrievable based on the owner identifier. The computing device 500 is further configured to retrieve the public key associated with the current owner from the decentralized system 120 based on the owner identifier, and verify the current owner of the physical item based on the owner proof data structure and the retrieved public key.

In some embodiments, in response to verifying the authenticity and/or the owner of the physical item 110, the computing device 500 or the mobile application 552 is configured to generate a visualization, visualizing the result of the verification.

In some embodiments, the NFT 800 also contains metadata associated with the NFT 800. In some embodiments, the metadata 850 includes an item identifier 852 associated with the physical item 110, corresponding to the item identifier 712 of FIG. 7. In some embodiments, the metadata 850 also includes a service end point 854 of the data system 170 configured to store a data record associated with the physical item 110. In some embodiments, the service end point is also stored in the smart fabric. Referring back to FIG. 7, in some embodiments, the first dataset 710 or the second dataset 720 also contains a service end point 728, corresponding to the service end point 854 of FIG. 8.

The ellipsis 856 represents that other metadata associated with the NFT and/or the physical item can also be recorded in an NFT. In particular, an NFT can evolve over time, and the changes to the NFT and/or the physical item can also be recorded in the NFT as additional metadata. For example, a repairer may perform certain repair work on a physical item associated with an NFT. An identifier of the repairer and data related to the repair work may also be recorded as metadata in the NFT.

Additionally, in some cases, a physical item may have some connection with another physical item. In such a case, the metadata of the physical item may also include an NFT identifier associated with the other physical item. For example, a set of luxury goods (sold together) may include multiple physical items, each of which may be associated with a different NFT, and the other NFT identifiers associated with the other physical items in the set may also be stored as metadata of each individual NFT. As such, when a set of multiple physical items are physically linked together, their corresponding NFTs are digitally linked together. As another example, an artist may create a first physical item and associate the first physical item with a first NFT. Later, the artist may create a second physical item, and associate the second physical item with a second NFT. If the first item and the second item form a set, the second NFT may include an NFT identifier of the first NFT in its metadata, and the first NFT may be added an NFT identifier of the second NFT in its metadata. When a potential buyer is presented with a single item of the set, the potential buyer can retrieve the NFT to find out that there should be another item in the set, and such findings may further help the potential buyer in making their purchase decisions.

In some embodiments, the computing device 500 is also configured to extract the service end point from the smart fabric 112 and/or the NFT 122 and access the data system 170 via the service end point 854 to retrieve the data record associated with the physical item 110, such as (but not limited to) (1) attribute(s) of the physical item 110 (e.g., a design, a color, a photo, and/or a sales price of the physical item 110), (2) personal information associated with owner(s) of the physical item 110 (e.g., a name, an email address, a phone number, a physical address of each owner), and/or (3) service performed on the physical item 110 (e.g., repair, maintenance, appraisal). In some embodiments, in response to retrieving the data record associated with the physical item 110, the computing device 500 is configured to generate a visualization, visualizing the data record associated with the physical item, e.g., displaying a photo of the physical item.

Figure 6:
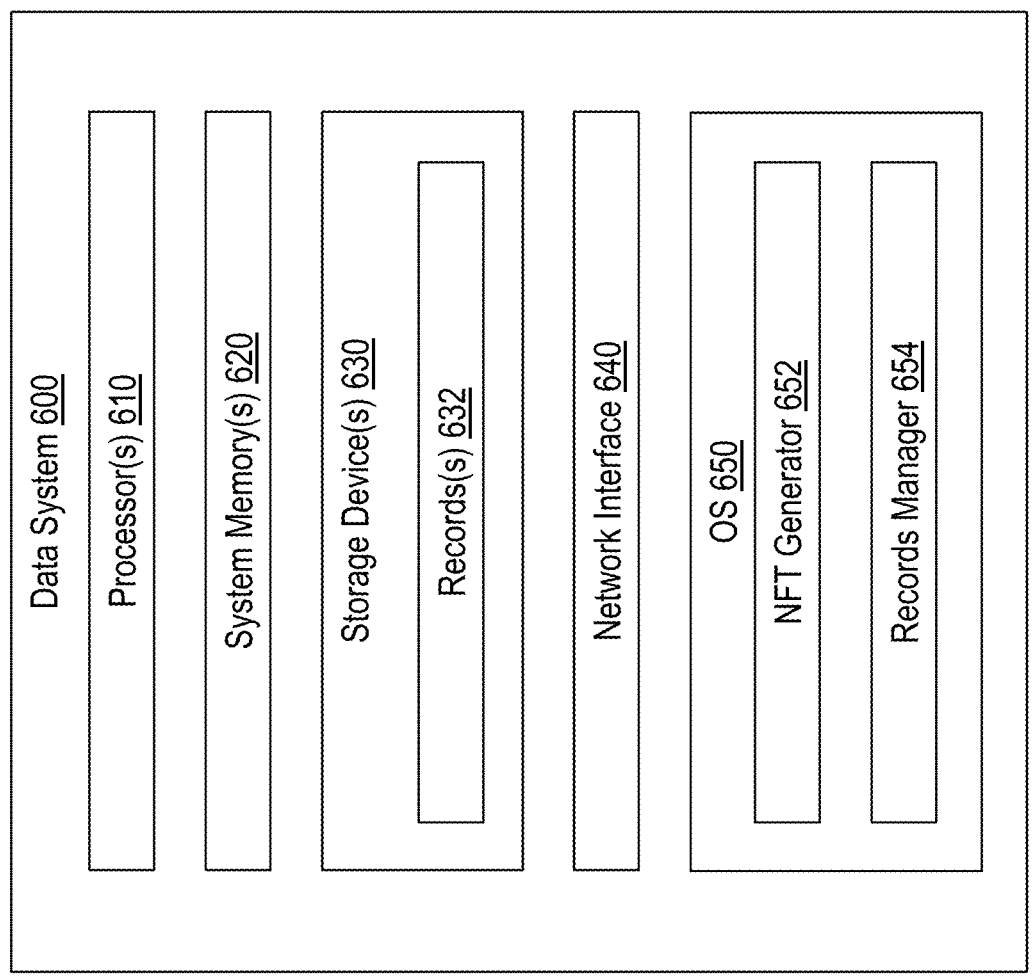
FIG. 6 illustrates an example architecture of a data system configured to store data records associated with physical items.

FIG. 6 illustrates an example architecture of a data system 600 that corresponds to the data system 170 of FIG. 1A or 1B. The data system 600 includes one or more processors 610, one or more system memories 620, one or more storage devices 630, and a network interface 640. In some embodiments, the data system 600 has an operating system 650 installed on the one or more storage devices 630 and loaded into the one or more system memories 620. The one or more storage devices 630 not only store the operating system 650 but also store one or more records 632 of physical items. The data system 600 also includes a datasets manager 654 configured to manage data records 632 associated with one or more physical items.

In some embodiments, the data system 600 also includes an NFT generator 652 configured to generate NFTs associated with physical items. For example, when a new record associated with a new physical item is entered in the data system 600, the data system 600 is configured to generate and record a new NFT in the decentralized system 120 and record an NFT identifier associated with the new NFT relationally with the data associated with the physical item. As another example, when ownership of one of the one or more physical items is changed, the data system 600 is configured to cause ownership of the NFT in the decentralized system to be updated.

Figure 9A:
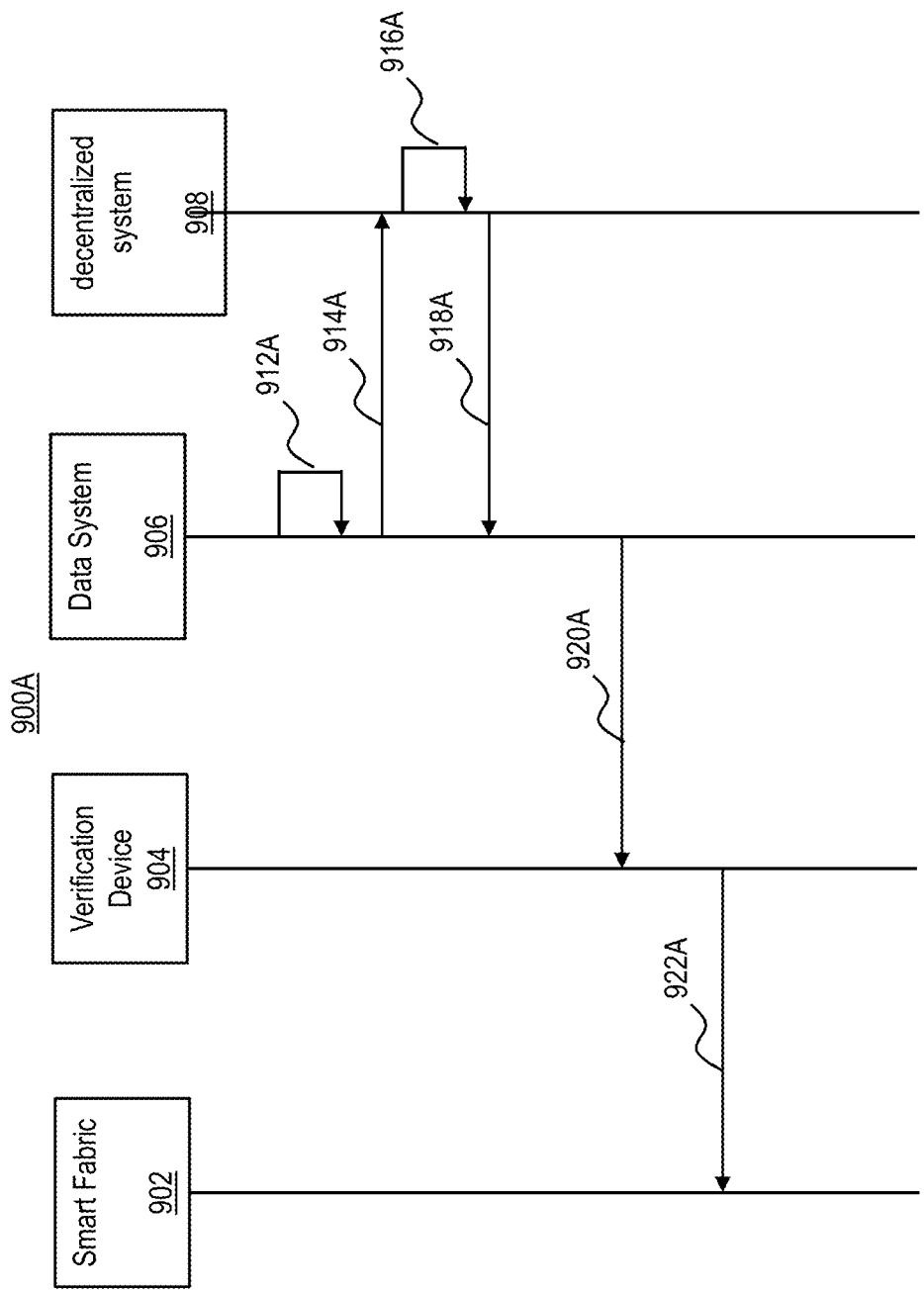
FIG. 9A illustrates an example communication pattern for registering a new physical item and associating the new physical item with a new NFT.
Figure 9C:
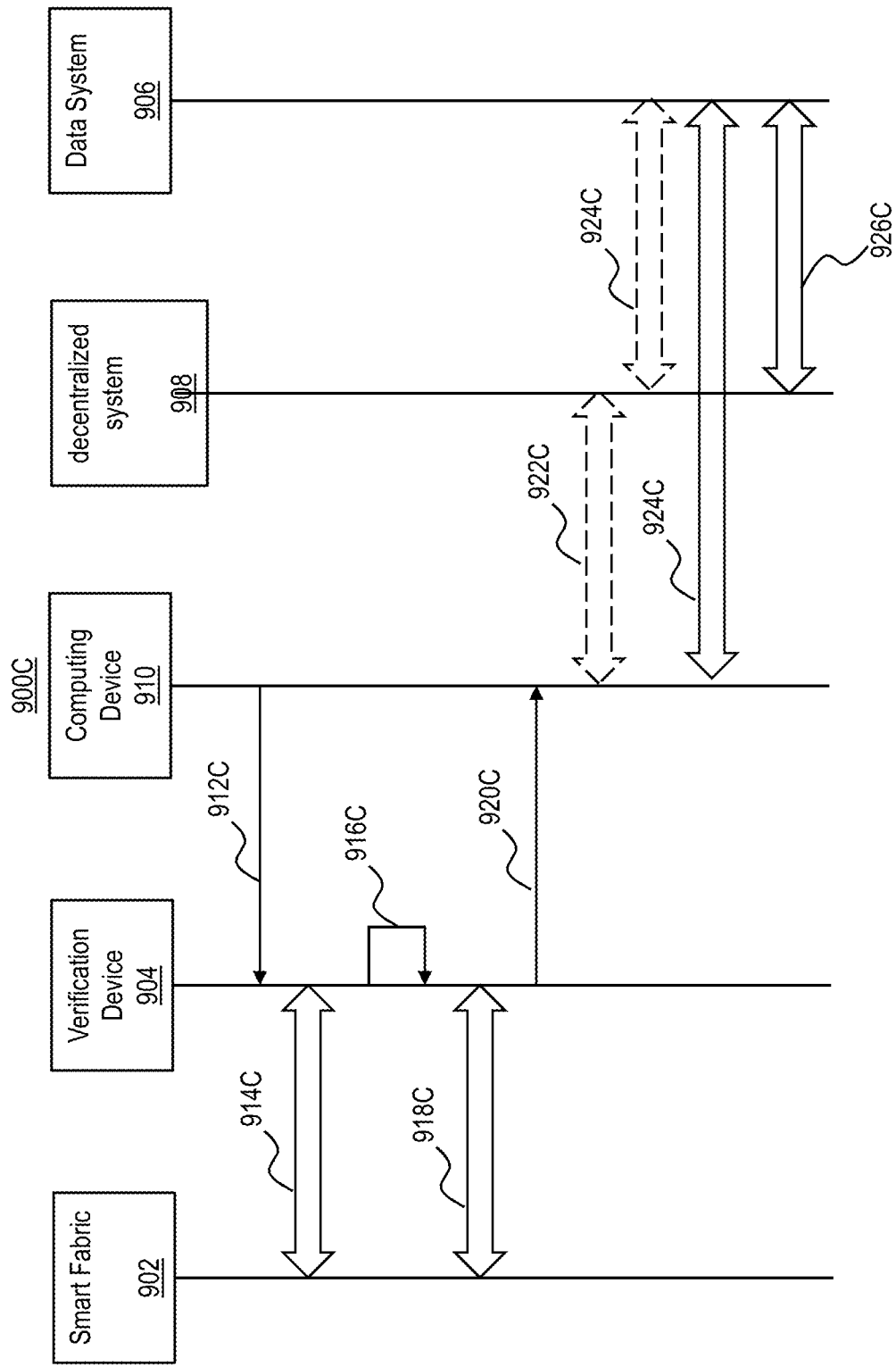
FIG. 9C illustrates an example communication pattern for changing ownership of a physical item associated with an NFT.

FIGS. 9A-9C illustrate examples of communication patterns among a smart fabric 902 (corresponding to the smart fabric 112), a verification device 904 (corresponding to the verification device 390, 400), a data system 906 (corresponding to the data system 170), a decentralized system 908 (corresponding to the decentralized system 120), and/or a computing device 910 (corresponding to the computing device 160).

FIG. 9A illustrates an example communication pattern 900A for registering a new physical item and associating the new physical item with a new NFT. As illustrated in FIG. 9A, the data system 906 is configured to generate a new record associated with a new physical item (represented by arrow 912A). In response to generating a new record, the data system 906 is configured to send a request to the decentralized system 908 (represented by arrow 914A), causing the new NFT to be registered in the decentralized system 908 (represented by arrow 916A). In response to registering the NFT, the data system 906 retrieves the new NFT from the decentralized system 908 (represented by arrow 918A) and sends the NFT and/or an identifier of the physical item to the verification device 904 (represented by arrow 920A). Receiving the NFT and/or the identifier of the physical item to the verification device 904, the verification device 904 sends a first dataset associated with the physical item and a second dataset associated with the NFT to the smart fabric 902 (represented by arrow 922A), causing the smart fabric 902 to store the first dataset and the second dataset (corresponding to the first dataset 710 and the second dataset 720 of FIG. 7).

Once the first dataset and the second dataset are stored in the smart fabric 902, a computing device 910 (e.g., a computing device associated with the current owner or a potential buyer) can be used to verify authenticity and/or ownership of the physical item. FIG. 9B illustrates an example communication pattern 900B for verifying authenticity and/or ownership of the physical item. As illustrated in FIG. 9B, the computing device 910 sends a request to the verification device 904 (represented by arrow 912B), causing the verification device 904 to retrieve the first dataset (associated with the physical item) and/or the second dataset (associated with the NFT) stored in the smart fabric (represented by arrow 914B). The verification device 904 then passes the first dataset (associated with the physical item) and/or the second dataset (associated with the NFT) to the computing device 910 (represented by arrow 916B). The computing device 910 then retrieves the NFT from the decentralized system 908 based on the received dataset(s) (represented by arrow 918B).

As shown in FIG. 8, in some embodiments, the NFT 800 includes a creator proof data structure 830, including a signature signed by a private key of a creator of the NFT (corresponding to a creator of the physical item) and/or a current owner proof data structure 844 including a signature signed by a private key of a current owner of the NFT (corresponding to a current owner of the physical item). In response to receiving the NFT, the computing device 910 is configured to extract the creator identifier and the creator proof data structure 830 and/or the owner identifier and the current owner proof data structure 844 from the NFT (represented by arrow 920B). The computing device 910 then retrieves a public key associated with the creator of the physical item based on the creator identifier and/or a public key associated with the current owner based on the owner identifier from the decentralized system (represented by arrow 922B). After retrieving the public key associated with the creator or the public key associated with the current owner, the computing device 910 is configured to verify authenticity and/or ownership of the NFT (corresponding to the authenticity and/or ownership of the physical item) (represented by arrow 924B).

In some embodiments, as shown in FIG. 8, the NFT further includes a service end point of the data system 906. The computing device 910 is also configured to extract the service end point from the NFT and access the data system via the service end point (represented by arrow 926B). In some embodiments, the computing device 910 is configured to send the first dataset and/or the second dataset to the data system 906 to retrieve a data record associated with the physical item from the data system 906. In some embodiments, in response to receiving the data record, the computing device 910 is configured to visualize the received data record. For example, in some embodiments, when the data record includes a photo of the physical item, the computing device 910 is configured to display the photo of the physical item.

As briefly mentioned above, the computing device 910 may be a mobile device associated with any users (such as a potential buyer of the physical item). After verifying the authenticity and/or the ownership of the physical item, a potential buyer may decide to purchase the physical item. When the purchase event occurs, the ownership of the physical item is changed from the current owner to a new owner.

FIG. 9C illustrates an example communication pattern 900C for transferring ownership from a current owner to a new owner. As illustrated in FIG. 9C, the computing device 910 sends a request to the verification device 904 for changing the ownership of the physical item (represented by arrow 912C). The request includes an identifier associated with a requester and an identifier of a new owner. In response to receiving the request, the verification device 904 retrieves the first dataset and/or the second dataset from the smart fabric 902 (represented by arrow 914C). The first dataset and/or the second dataset contain data associated with the current owner.

In response to receiving the first dataset and/or the second dataset, the verification device 904 compares data associated with the current owner and the identifier associated with the requester to determine whether the requester is associated with the current owner of the physical item (represented by the arrow 916C). In response to determining that the requester is associated with the current owner of the physical item, the verification device 904 causes the first dataset and/or second dataset (containing data associated with the current owner) to be updated to a new owner (represented by arrow 918C). After the second dataset is updated, the verification device 904 sends a confirmation to the computing device 910 (represented by arrow 920C). In some embodiments, in response to updating the ownership of the physical item, the verification device 904 is also configured to cause a notification to be sent to a device associated with the previous owner or the new owner.

Further, in response to updating the ownership of the physical item, the ownership of the corresponding NFT is also updated in the decentralized system. In some embodiments, the NFT may be updated by the computing device 910, the data system 906, and/or the verification device 904. For example, in some embodiments, the computing device 910 is also configured to update the ownership of the NFT with the decentralized system 908 (represented by arrow 922C).

In some embodiments, in response to updating the ownership of the physical item and/or the NFT, the data record associated with the physical item is also updated accordingly in the data system (represented by arrow 924C). In some embodiments, the computing device 910 is configured to send the updated ownership to the data system 906, causing the data record associated with the physical item to be updated in the data system (represented by arrow 926C). In some embodiments, the data system 906 is configured to detect the ownership change of the NFT from the decentralized system 908 directly, and in response to detecting the ownership change, update the ownership of the physical item in the data record automatically.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
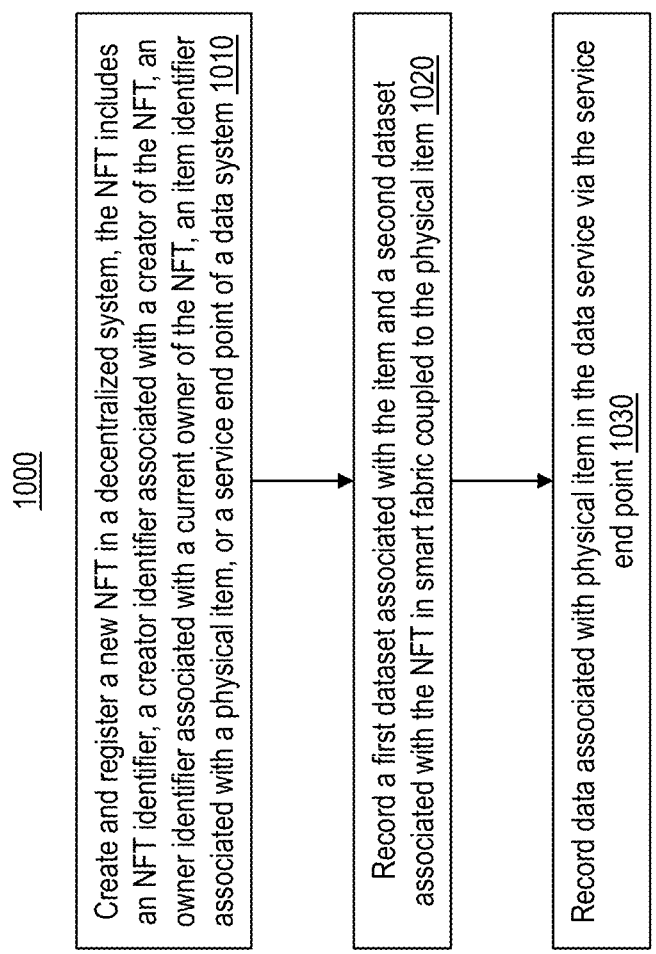
FIG. 10 illustrates a flowchart of an example method for registering a new physical item and associating the new physical item with a new NFT.

FIG. 10 illustrates a flowchart of an example method 1000 for generating and associating a new NFT with a physical item, which may be performed by the computer system 140 associated with a creator of the physical item and/or the data system 170 of FIG. 1A or 1B. The method 1000 includes creating and registering a new NFT in a decentralized system (act 1010). In some embodiments, the NFT corresponds to the NFT 800 of FIG. 8, which includes an NFT identifier associated with the NFT, a creator identifier associated with a creator of the NFT, an owner identifier associated with a current owner of the NFT, an item identifier associated with the physical item, and/or a service end point of a data system.

The method 1000 also includes recording a first dataset associated with the physical item and/or a second dataset associated with the NFT in a piece of smart fabric coupled to the physical item (act 1020). In some embodiments, the first dataset and the second dataset correspond to the first dataset 710 and the second dataset 720 of FIG. 7. As such, the first dataset includes the item identifier associated with the item, and the second dataset includes the NFT identifier associated with the NFT, the creator identifier associated with the creator, and/or the owner identifier associated with the owner. The method 1000 also includes registering the physical item in the data service via the service end point (act 1030), recording data associated with the physical item in a data record.

After a physical item is associated with an NFT, and a first dataset associated with the physical item and a second dataset associated with the NFT are stored in a piece of smart fabric coupled to the physical item, authenticity and/or owner ship of the physical item can be verified via the decentralized system on which the NFT is recorded.

Figure 11:
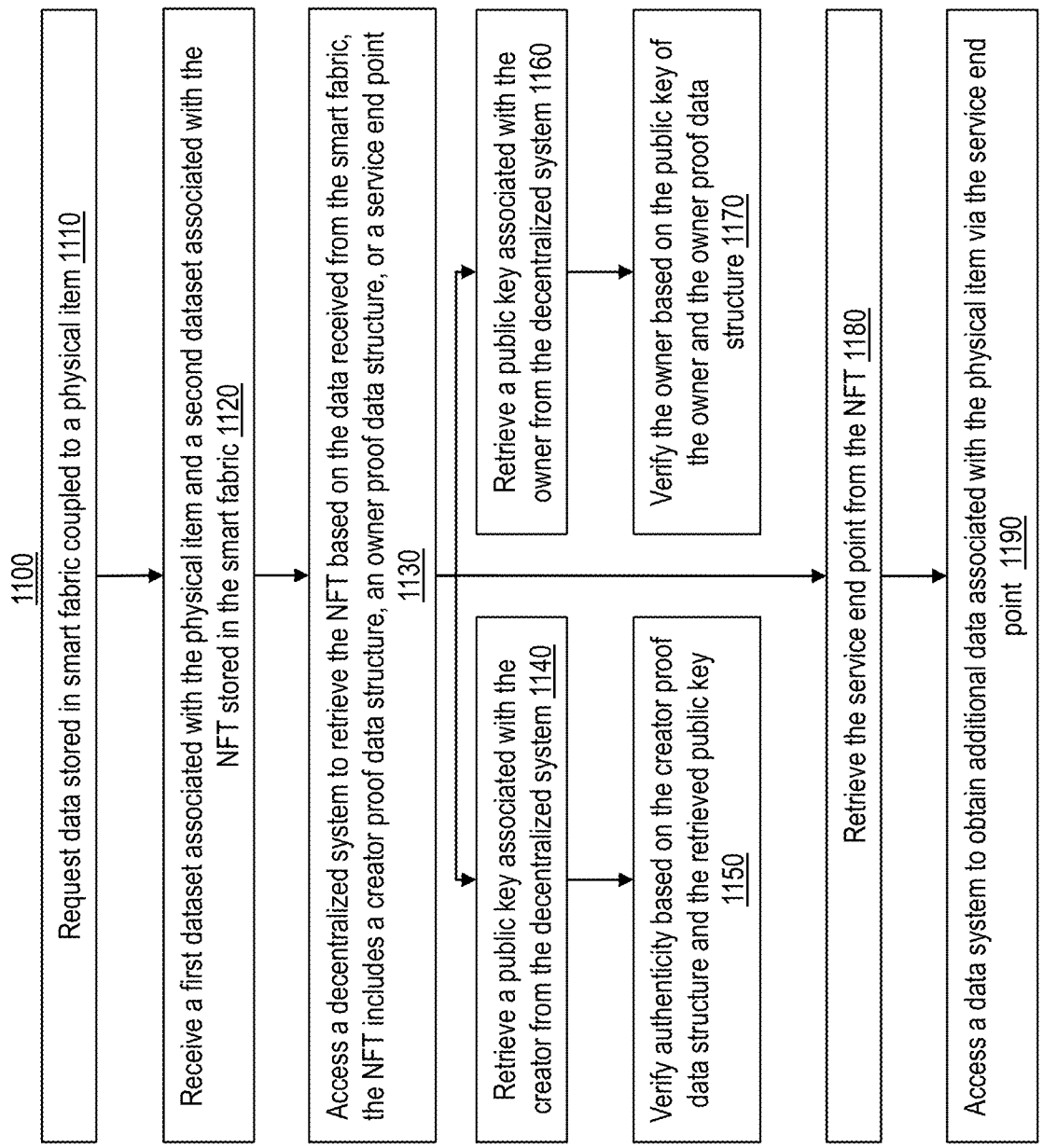
FIG. 11 illustrates a flowchart of an example method for verifying authenticity and/or ownership of a physical item associated with an NFT.

FIG. 11 illustrates a flowchart of an example method 1100 for verifying authenticity and/or ownership of a physical item associated with an NFT, which may be performed by a computing device, e.g., a mobile device of a current owner or a potential buyer. The method 1100 includes requesting data stored in a piece of smart fabric coupled to a physical item (act 1110). In some embodiments, the request is sent to a verification device coupled to the piece of smart fabric. In response to receiving the request, the verification device retrieves a first dataset associated with the physical item (corresponding to the first dataset 710 of FIG. 7) and a second dataset associated with the NFT (corresponding to the second dataset 720 of FIG. 7) from the piece of smart fabric and send the retrieved first dataset and second dataset to the computing device. As such, the computing device receives the first dataset and the second dataset stored in the smart fabric (act 1120).

In response to receiving the first dataset and the second dataset, the computing device is configured to access a decentralized system to retrieve the NFT based on the second dataset received from the smart fabric (act 1130). The NFT corresponds to the NFT 800 of FIG. 8. In some embodiments, the NFT 800 includes a creator proof data structure 830, an owner proof data structure 844, and/or a service end point 854. In some embodiments, the creator proof data structure 830 includes a signature signed by a private key associated with a creator of the physical item. A public key corresponding to the private key is recorded in the decentralized system. The method 1100 further includes retrieving the public key associated with the creator from the decentralized system (act 1140), and verifying authenticity based on the creator proof data structure and the retrieved public key (act 1150). In some embodiments, the owner proof data structure 844 includes a signature signed by a private key associated with a creator of the physical item. A public key corresponding to the private key is recorded on the block chain. The method 1100 further includes retrieving the public key associated with the owner from the decentralized system (act 1160), and verifying authenticity based on the creator proof data structure and the retrieved public key (act 1170).

In some embodiments, the NFT further includes a service end point of a data system configured to store data record associated with the physical item, including (but not limited to) (1) attribute(s) of the physical item 110 (e.g., a design, a color, a photo, and/or a sales price of the physical item), (2) personal information associated with owner(s) of the physical item 110, and/or (3) service performed on the physical item 110 (e.g., repair, maintenance, appraisal). The method 1100 also includes retrieving the service end point of the data system from the NFT (act 1180) and accessing the data system to obtain a data record associated with the physical item via the service end point (act 1190).

After a potential customer verifies the authenticity and/or ownership of the physical item, the potential customer may want to purchase the physical item, such that ownership of the physical item would change from a current owner to a new owner.

Figure 12:
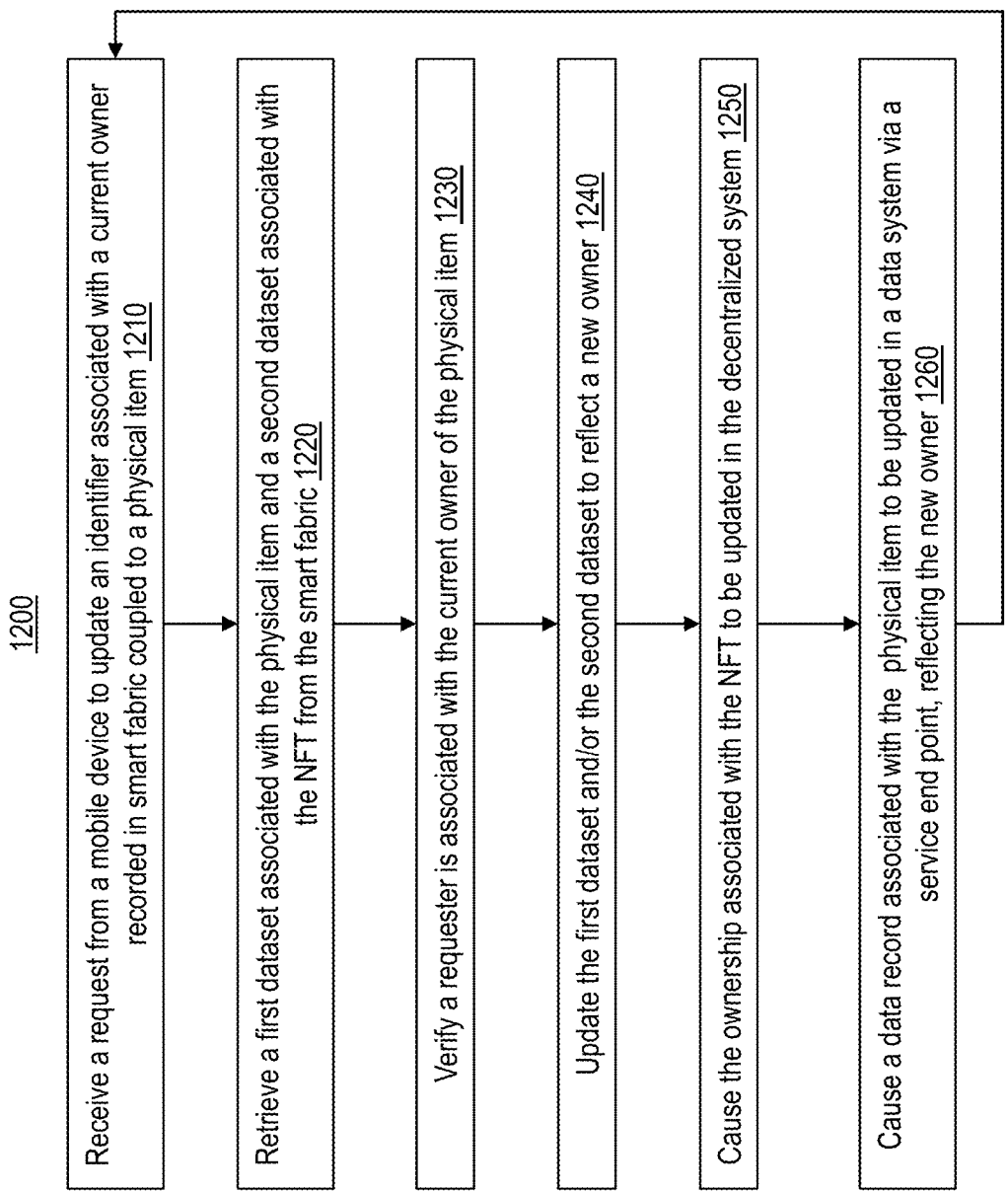
FIG. 12 illustrates a flowchart of an example method for changing ownership of a physical item associated with an NFT.

FIG. 12 illustrates a flowchart of an example method 1200 for updating ownership of a physical item associated with an NFT, which may be performed by a verification device connected to a piece of smart fabric coupled to the physical item. The method 1200 includes receiving a request from a computing device to update an identifier associated with a current owner recorded in a piece of smart fabric coupled to the physical item (act 1210). The request includes an identifier associated with a requester and an identifier associated with a new owner. In response to receiving the request, the verification device is configured to retrieve a first dataset associated with the physical item and/or a second dataset associated with the NFT (act 1220). The first dataset and/or the second dataset include data associated with the current owner of the physical item. The verification device compares the data associated with the current owner of the physical item with the identifier associated with the requester to determine whether the requester corresponds to the current owner (act 1230). In response to verifying that the requester corresponds to the current owner, the verification device causes the data associated with the current owner of the physical item (stored in the piece of smart fabric) to be updated to reflect the new owner (act 1240).

In some embodiments, the verification device is also configured to cause the ownership associated with the NFT to be updated in the decentralized system (act 1250) and/or cause a data record associated with the physical item to be updated in a data system via a service end point, reflecting the new owner (act 1260). In some embodiments, the verification device is configured to access the decentralized system directly to update the NFT. In some embodiments, the verification device is configured to cause the computing device (that is associated with the requester) to update the NFT. In some embodiments, the verification device is configured to communicate with the decentralized system directly to update the NFT. Similarly, in some embodiments, the verification device is configured to cause the computing device to communicate with the data system to update the data record. In some embodiments, the verification device is configured to communicate with the data system directly to cause the data record to be updated.

The above descriptions are primarily related to using NFTs to track creatorship and ownership of physical items, though additional functions may also be implemented in a smart contract of the NFTs. For example, in some embodiments, a smart contract can be built into an NFT to associate the NFT and/or the corresponding physical item with a value (e.g., a cryptocurrency value), and allow ownership to be updated only after sufficient value is paid from a buyer to a current owner. As another example, in some embodiments, a smart contract can be built into an NFT to further record additional types of events associated with the physical item, such as (but not limited to) a maintenance event, a repair event, an appraisal event. Each time when one of these types of events occurs, the NFT is updated to record the event, such that not only purchase transactions, but also additional events in a life cycle of the physical item are also recorded in the decentralized system, allowing potential buyers to have a more complete picture of the physical item. In some embodiments, additional data associated with these events may also be recorded in the data system, such as (but not limited to) before and after photos of a maintenance job and/or comments of the person handling the maintenance job.

Finally, because the principles described herein may be performed in the context of a computing system (for example, each of the verification device 390, 400, the computer system 140, data system 170, 600, computing device 160, 500 may include one or more computing systems) some introductory discussion of a computing system will be described with respect to FIG. 13.

Computing systems are now increasingly taking a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 13:
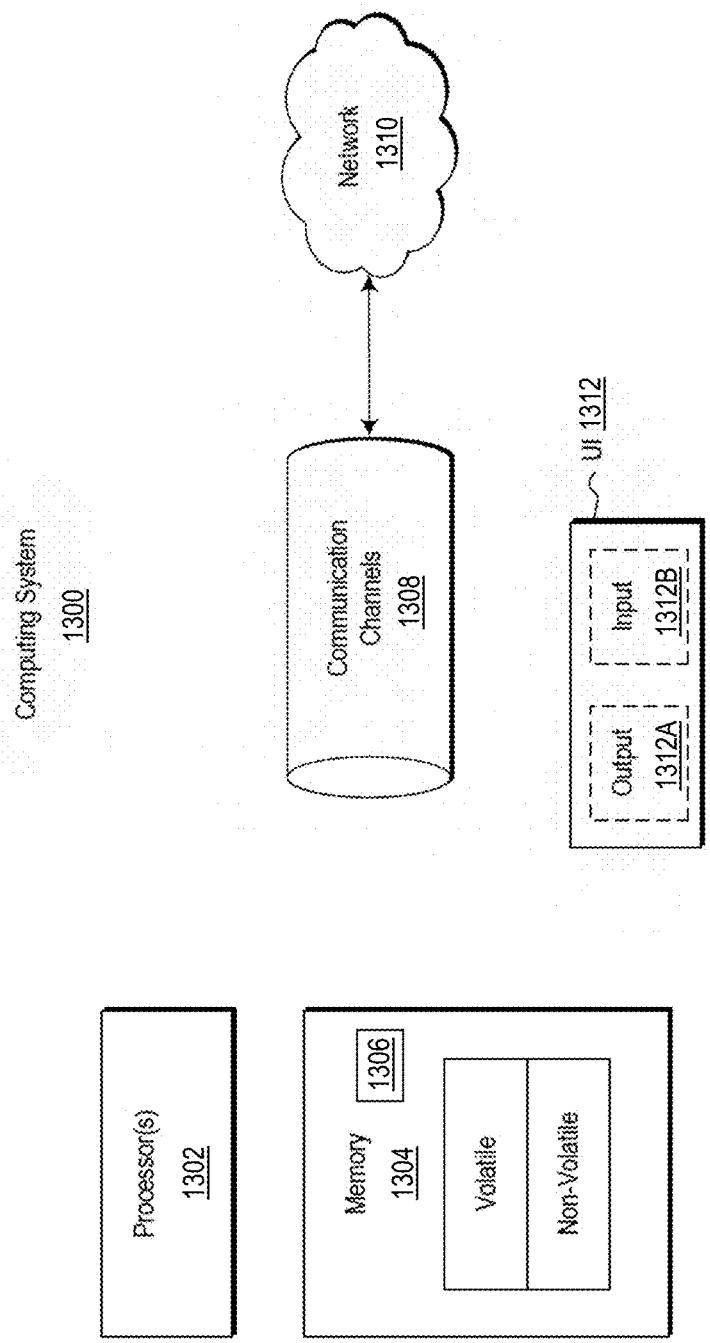
FIG. 13 illustrates an example computing system in which the principles described herein may be employed.

As illustrated in FIG. 13, in its most basic configuration, a computing system 1300 typically includes at least one hardware processing unit 1302 and memory 1304. The processing unit 1302 may include a general-purpose processor and may also include a field-programmable gate array (FPGA), an application-specific integrated circuit (ASIC), or any other specialized circuit. The memory 1304 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1300 also has thereon multiple structures often referred to as an "executable component". For instance, memory 1304 of the computing system 1300 is illustrated as including executable component 1306. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 1304 of the computing system 1300. Computing system 1300 may also contain communication channels 1308 that allow the computing system 1300 to communicate with other computing systems over, for example, network 1310.

While not all computing systems require a user interface, in some embodiments, the computing system 1300 includes a user interface system 1312 for use in interfacing with a user. The user interface system 1312 may include output mechanisms 1312A as well as input mechanisms 1312B. The principles described herein are not limited to the precise output mechanisms 1312A or input mechanisms 1312B as such will depend on the nature of the device. However, output mechanisms 1312A might include, for instance, speakers, displays, tactile output, holograms, and so forth. Examples of input mechanisms 1312B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmissions media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NTC"), and then eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 1300 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 1302 and memory 1304, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented at a computing system for linking a physical item with a non-fungible token (NFT) registered in a decentralized system, the physical item being coupled to a piece of smart fabric having a grid of cells configured to receive and persistently store one or more datasets associated with the physical item or the NFT, the method comprising:

creating a new NFT associated with the physical item, the NFT containing an NFT identifier associated with the NFT, an item identifier associated with the physical item, and a creator identifier associated with a creator of the NFT, the creator of the NFT corresponding to a creator of the physical item, and the NFT being registered in the decentralized system;

storing at least one of (1) a first dataset associated with the physical item or (2) a second dataset associated with the NFT, in the grid of cells of the smart fabric;

in response to receiving a request, from a computing device, for requesting data stored in the grid of cells of the smart fabric, sending at least one of the first dataset or the second dataset to the computing device, causing the computing device to:
- retrieve the NFT from the decentralized system based on the first dataset or the second dataset;
- verify the creator of the NFT; and
- in response to verification of the creator of the NFT, determine that the physical item is authentic.

2. The method of claim 1, wherein:
the NFT also includes a creator proof data structure including a signature generated using a private key associated with the creator and verifiable using a public key associated with the creator;
the public key associated with the creator is recorded in the decentralized system, such that authenticity of the NFT or the physical item is verifiable by the public key recorded in the decentralized system;
the method further includes:
- extracting the creator identifier and the creator proof data structure from the NFT;
- retrieving the public key associated with the creator from the decentralized system based on the creator identifier; and
- verifying authenticity of the physical item based on the retrieved public key.

3. The method of claim 1, wherein the NFT also contains an owner identifier associated with an owner of the NFT, the owner of the NFT corresponding to an owner of the physical item;
the method further comprises storing the owner identifier in the grid of cells of the smart fabric.

4. The method of claim 3, wherein the NFT further contains an owner proof data structure including a signature signed by a private key associated with the owner and verifiable by a public key associated with the owner,
the method further includes:
- extracting the owner identifier and the owner proof data structure from the NFT;
- retrieving the public key associated with the creator from the decentralized system based on the owner identifier; and
- verifying authenticity of the physical item based on the retrieved public key.

5. The method of claim 4, wherein:
the NFT also includes a service end point of a data system configured to store a data record associated with the physical item;
the method further includes causing the computing device to access the service end point of the data system to obtain the data record associated with the physical item.

6. The method of claim 5, the method further comprising:
receiving a request, from the computing device, to update data associated with a current owner stored in the grid of cells;
in response to verifying that the computing device is associated with the current owner,
- causing data associated with a new owner to be stored in the grid of cells; and
- causing ownership of the NFT to be updated accordingly in the decentralized system.

7. The method of claim 6, the method further comprising:
causing data record stored in the data system to be updated to reflect the new owner via the service end point.

* * * * *